United States Patent
Yiu et al.

(10) Patent No.: US 9,160,515 B2
(45) Date of Patent: Oct. 13, 2015

(54) USER EQUIPMENT AND METHODS FOR HANDOVER ENHANCEMENT USING SCALED TIME-TO-TRIGGER AND TIME-OF-STAY

(71) Applicant: Intel IP Corporation, Santa Clara, CA (US)

(72) Inventors: Candy Yiu, Portland, OR (US); Yujian Zhang, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 70 days.

(21) Appl. No.: 14/107,947

(22) Filed: Dec. 16, 2013

(65) Prior Publication Data

US 2014/0302851 A1    Oct. 9, 2014

Related U.S. Application Data

(60) Provisional application No. 61/808,597, filed on Apr. 4, 2013.

(51) Int. Cl.
| | |
|---|---|
| H04W 36/00 | (2009.01) |
| H04L 5/00 | (2006.01) |
| H04B 7/02 | (2006.01) |
| H04W 24/02 | (2009.01) |
| H04W 74/08 | (2009.01) |
| H04B 1/38 | (2015.01) |
| H04W 76/00 | (2009.01) |
| H04W 36/30 | (2009.01) |

(Continued)

(52) U.S. Cl.
CPC ............... *H04L 5/0094* (2013.01); *H04B 1/38* (2013.01); *H04B 7/024* (2013.01); *H04L 5/0053* (2013.01); *H04W 24/02* (2013.01); *H04W 74/0808* (2013.01); *H04W 76/00* (2013.01); *H04B 7/0456* (2013.01); *H04B 7/0639* (2013.01); *H04W 36/30* (2013.01)

(58) Field of Classification Search
CPC ... H04L 5/0094; H04L 5/0053; H04W 76/00; H04W 24/02; H04W 74/0808; H04W 36/30; H04B 1/38; H04B 7/024; H04B 7/0639; H04B 7/0456
USPC .......................... 455/436–444; 370/321–334
See application file for complete search history.

(56) References Cited

U.S. PATENT DOCUMENTS

| | | | | |
|---|---|---|---|---|
| 8,619,654 | B2 * | 12/2013 | Yang et al. | 370/311 |
| 8,818,376 | B2 * | 8/2014 | Yiu et al. | 455/436 |
| 2009/0059871 | A1 * | 3/2009 | Nader et al. | 370/337 |

(Continued)

OTHER PUBLICATIONS

3GPP TS 36.331 V10.8.0 (Dec. 2012) Technical Specification 3rd Generation Partnership Project; Technical Specification Group Radio Access Network; Evolved Universal Terrestrial Radio Access (E-UTRA); Radio Resource Control (RRC); Protocol specification (Release 10), hereinafter TS36.331.*

(Continued)

*Primary Examiner* — Ronald Eisner
(74) *Attorney, Agent, or Firm* — Schwegman Lundberg & Woessner, P.A.; Gregory J. Gorrie

(57) ABSTRACT

Embodiments of user equipment (UE) and method for handover enhancement using a scaled time-to-trigger (TTT) and a time-of-stay are generally described herein. In some embodiments, the TTT is scaled based on at least one of a measured reference signal received quality (RSRQ) value of a serving cell and a time-of-stay in the serving cell.

5 Claims, 2 Drawing Sheets

(51) Int. Cl.
*H04B 7/04* (2006.01)
*H04B 7/06* (2006.01)

(56) References Cited

U.S. PATENT DOCUMENTS

| | | | |
|---|---|---|---|
| 2013/0196664 A1* | 8/2013 | Yiu et al. | 455/436 |
| 2013/0303231 A1* | 11/2013 | Yiu et al. | 455/525 |
| 2013/0324174 A1* | 12/2013 | Mueck | 455/509 |
| 2014/0302851 A1* | 10/2014 | Yiu et al. | 455/436 |
| 2015/0078335 A1* | 3/2015 | Sivanesan et al. | 370/331 |
| 2015/0111581 A1* | 4/2015 | Yiu et al. | 455/437 |

OTHER PUBLICATIONS

3GPP TS 36.201 V11.1.0 (Dec. 2012) Technical Specification 3rd Generation Partnership Project; Technical Specification Group Radio Access Network; Evolved Universal Terrestrial Radio Access (E-UTRA); LTE physical layer; General description (Release 11), hereinafter TS36.201.*

* cited by examiner

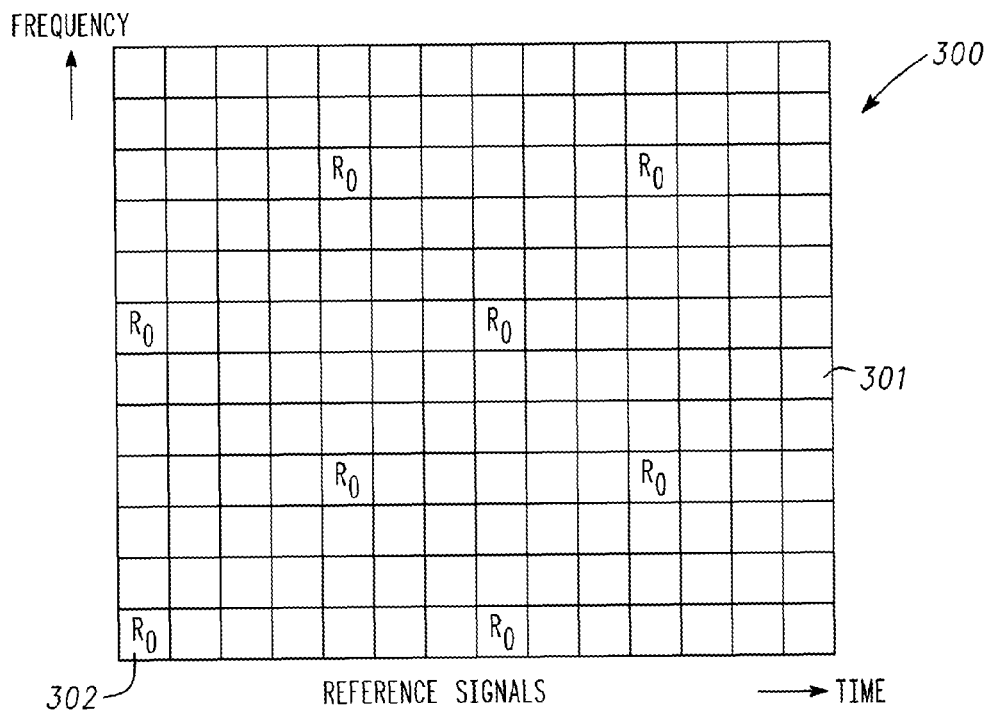
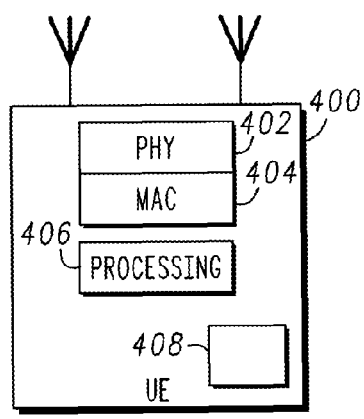

USER EQUIPMENT AND METHODS FOR HANDOVER ENHANCEMENT USING SCALED TIME-TO-TRIGGER AND TIME-OF-STAY

PRIORITY CLAIM

This application claims priority under 35 USC 119(e) to U.S. Provisional Patent Application Ser. No. 61/808,597 (reference number P55483Z) filed Apr. 4, 2013, which is incorporated herein by reference in its entirety.

TECHNICAL FIELD

Embodiments pertain to wireless cellular communications. Some embodiments relate to heterogeneous network (HetNet) mobility. Some embodiments relate to handover between cells including handover between cells of different cell layers. Some embodiments relate to handover failure.

BACKGROUND

One issue with cellular communication networks is determining when a mobile device should be handed over between cells (i.e., from a serving cell to a target cell). One of the challenges is performing a handover (HO) before the radio link fails. This is particularly an issue in heterogeneous networks (HetNets) where small cells are overlaid by larger cells. Higher-mobility devices have made these handover challenges increasingly difficult.

Thus, there are general needs for improved handover techniques that reduce the radio-link failure rate. There are also general needs for improved handover techniques that increase handover efficiency and operate with less overhead. There are also general needs for improved handover techniques that reduce the radio-link failure rate, particularly for fast moving and higher mobility mobile devices. There are also general needs for improved handover techniques suitable for HetNet mobility.

BRIEF DESCRIPTION OF THE DRAWINGS

FIG. 3 illustrates reference signal locations in accordance with some embodiments; and FIG. 4 is a block diagram of user equipment (UE) in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
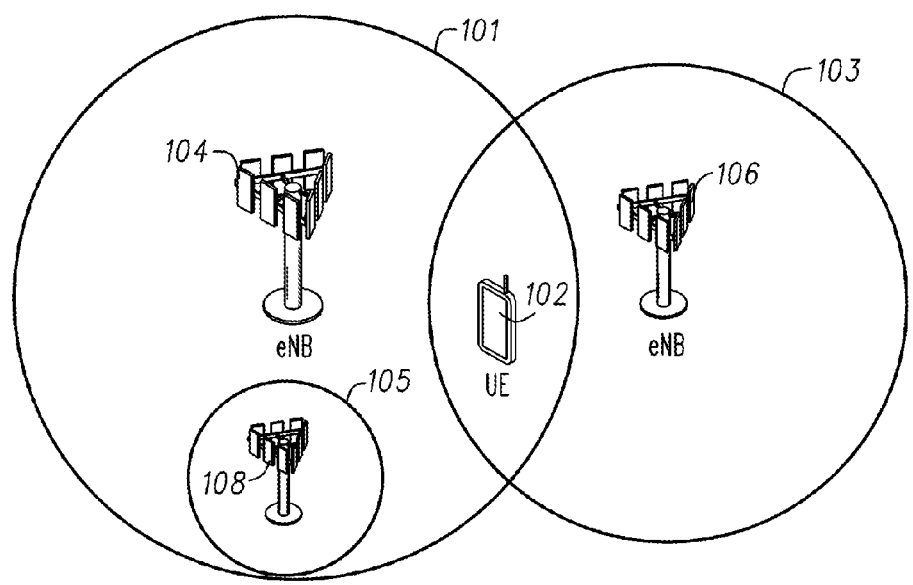
FIG. 1 illustrates cellular communications in accordance with some embodiments.

FIG. 1 illustrates cellular communications in accordance with some embodiments. A base station, such as an enhanced or evolved node B (eNB) 104, provides wireless communication services to communication devices, such as user equipment (UE) 102, within cell 101. A base station, such as eNB 106, provides wireless communication services to communication devices within cell 103. A base station, such as eNB 108, provides wireless communication services to communication devices within cell 105. In this example, eNB 104 may be the serving eNB. A handover may be performed from eNB 104 to another eNB, such as eNB 106 or eNB 108, to handover communications with the UE 102 when certain handover criteria are met.

Figure 2:
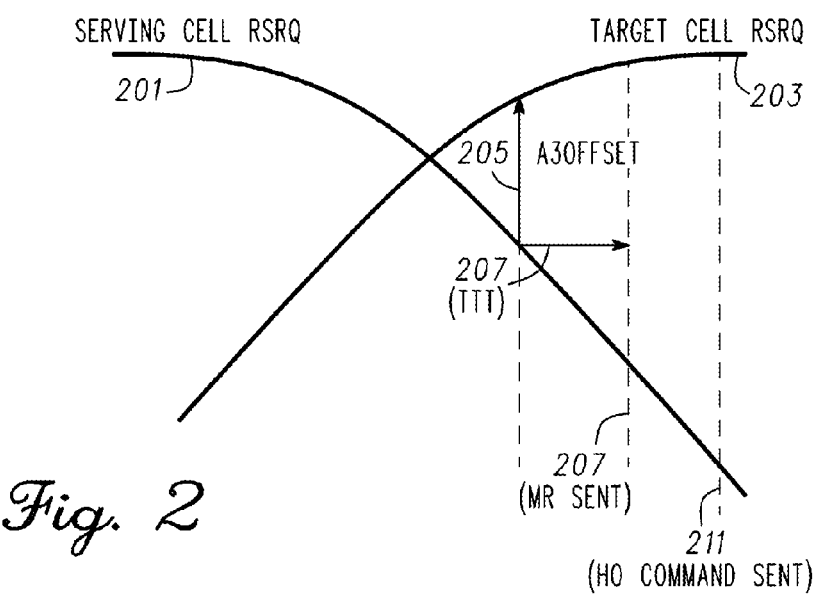
FIG. 2 illustrates an example of handover initiation criterion in accordance with some embodiments.

FIG. 2 illustrates an example of handover initiation criterion in accordance with some embodiments. Serving cell 101 (FIG. 1) may have a serving cell reference signal received quality (RSRQ) 201, and a target cell, such as target cell 103 (FIG. 1) may have a target cell RSRQ 203. In this example illustration, the serving cell RSRQ 201 and the target cell RSRQ 203 may vary as illustrated, which may be the case as a mobile station, such as UE 102 (FIG. 1), moves within the serving cell 101 with respect to the target cell 103. As illustrated in FIG. 2, when the target cell RSRQ 203 continuously exceeds the serving cell RSRQ 201 by at least the A3offset value 205 (i.e., an Event A3 or A3event) for a time-to-trigger (TTT) 207, the UE 102 may transmit a measurement report 209 to the eNB 104 of the serving cell 101. Then the eNB 104 of the serving cell 101 can make a handover decision and send a handover request.

An A3event (or Event A3), as used herein, may be a measurement-reporting event that occurs when a neighbor cell's RSRQ (e.g., target cell RSRQ 203) becomes an amount of offset (i.e., an A3offset value 205) better than the RSRQ of the primary cell (PCell) (e.g., the serving cell RSRQ 201). In some embodiments, an A3event may refer to an 'Event A3' in accordance with 3GPP T.S. 36.331 ($3^{rd}$ Generation Partnership Project; Technical Specification Group Radio Access Network; Evolved Universal Terrestrial Radio Access (E-UTRA); Radio Resource Control (RRC); Protocol specification (Release 11)) although this is not a requirement. In these embodiments, the Event A3 triggers the measurement report 209 when the A3offset 205 and TTT 207 requirements are met.

Embodiments disclosed herein, among other things, address the handover failure delivery problem (i.e., the UE does not get a HO command due to low SNR from the serving cell). In accordance with these embodiments, the UE 102 may be arranged to scale the TTT based on at least one of a measured reference signal received quality (RSRQ) value 201 of a serving cell 101 and a time-of-stay in the serving cell, and send a measurement report after expiration of the scaled TTT. In these embodiments, scaling the TTT based on RSRQ of the serving cell and/or a time-of-stay in the serving cell may help reduce HO failure and may help reduce the ping-pong effect.

In some embodiments, the UE 102 may be arranged to measure the RSRQ 201 of the serving cell 101, and scale down the TTT 207 (e.g., to a shorter TTT) when the measured RSRQ is below a predetermined value (i.e., with respect to the RSRQ 203 of target cell 103). The UE 102 may send the measurement report 209 after expiration of the scaled-down TTT (i.e., the short TTT). In these embodiments, the measurement report 209 may be sent more quickly to allow the UE 102 to receive an HO command 211 from the serving cell 201 sooner. Sending the HO command 211 from the serving cell 201 sooner allows that HO command 211 to be received by the UE 102 at a higher RSRQ level. This reduces HO failure resulting from inability of the UE to receive the HO command.

The predetermined value may be a value by which the serving cell RSRQ 201 is less than the target cell RSRQ 203. For example, if the predetermined value is −7 dB, the TTT may be scaled down to the short TTT value when the serving cell RSRQ 201 is 7 dB less than the target cell RSRQ 203. In these embodiments, the predetermined value may range from −5 dB to −10 dB, although the scope of the embodiments is not limited in this respect.

In accordance with embodiments, the A3offset 205 is used to trigger A3event at the UE side. When the UE enters A3event, conventionally, it may have a pre-defined TTT. In accordance with embodiments disclosed herein, the RSRQ may be used to determine which TTT should use.

In some embodiments, when the measured RSRQ 201 of the serving cell 101 is greater than or equal to the predetermined value (i.e., with respect to the RSRQ 203 of target cell 103), the UE 102 may be arranged to determine a time-of-stay in the serving cell 101, and scale down the TTT 207 (e.g., to a medium-short TTT) when the time-of-stay is greater than a predetermined value. The UE 102 may send the measurement report 209 after expiration of the scaled-down TTT (i.e., the short-medium TTT). In these embodiments, since the time of stay in the serving cell is greater, ping pong is unlikely and a quicker HO can be encouraged by reducing the TTT.

In some embodiments, the UE 102 may scale up the TTT 207 (e.g., to a longer TTT) when the time-of-stay is less than or equal to the predetermined value and may send the measurement report 209 after expiration of the scaled-up TTT (i.e., the longer TTT). In these embodiments, since the time of stay in the serving cell is short, ping pong is more likely and therefore a longer TTT can delay a HO to reduce the possibility of ping pong.

In these embodiments, the longer TTT may be longer than the TTT in the LTE standards, the shorter TTT may be shorter than the TTT in the LTE standards, and the medium-short TTT may be shorter than the TTT in the LTE standards but longer than the shorter TTT. These TTTs (i.e., the longer TTT, the shorter TTT and the medium-short TTT) may be determined by multiplying the TTT in the LTE standards by a scaling factor or may be predetermined or defined and available in memory or a look-up-table. In some embodiments, rather than scaling up or scaling down the TTT, the UE may select a shorter or longer TTT based on the conditions as discussed above.

In some embodiments, the handover initiation parameters (e.g., the TTT) may be selected based the serving cell type and the target cell type. The serving cell type may comprise either a macro cell or a pico cell and the target cell type may comprise either a macro cell or a pico cell. In the example illustrated in FIG. 1, cells 101 and 103 may be macro cells and eNBs 104 and 106 may be macro eNBs. Cell 105 may be a pico cell and eNB 108 may be a pico eNB. These embodiments are also described in more detail below.

In some embodiments, the handover initiation parameters may be selected based the handover type. The handover type may comprise one of a macro to macro cell handover, a pico to macro cell handover, a macro to pico cell handover or a pico to pico cell handover. These embodiments are also described in more detail below.

FIG. 3 illustrates reference signal locations in accordance with some embodiments. Reference signals 302 (illustrated as $R_0$) are shown at various locations within a resource block 300. Each resource block (RB) 300 may comprise resource elements 301 which may comprise a number of symbols in time and a number of subcarriers in frequency. In some embodiments, the RSRQ of reference signals 302 may be determined from a ratio of a RSRP to a received signal strength indicator (RSSI) for the RBs containing reference signals 302. The RSRP may be measured based on the average signal power level of all the reference signals 302 of a resource block 300.

In some embodiments, the RSRQ of a serving cell 201 and the RSRQ of a target cell 203 are determined in accordance with a 3GPP standard for E-UTRAN LTE (e.g., TS 36.214). The RSRQ of the serving cell 201 and the RSRQ of the target cell 203 may be used to determine an entering condition and a leaving condition for an Event A3 for handover initiation. These embodiments are described in more detail below.

FIG. 4 is a block diagram of a UE in accordance with some embodiments. UE 400 may be suitable for use as UE 102 (FIG. 1) although other configurations may also be suitable. The UE 400 may include physical-layer (PHY) layer circuitry 402 for communicating with an eNB through one or more antennas. The UE 400 may also include media-access control (MAC) layer circuitry 404 as well as processing circuitry 406 and memory 408.

In some embodiments, the UE 400 may include one or more of a keyboard, a display, a non-volatile memory port, multiple antennas, a graphics processor, an application processor, speakers, and other mobile device elements. The display may comprise an LCD screen including a touch screen. The one or more antennas utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 400 may be configured with the instructions to perform the operations described herein.

In some embodiments, the processing circuitry 406 may include one or more processors and the physical layer circuitry 402 may include radio-frequency (RF) circuitry and baseband circuitry. The RF circuitry may include both receiver and transmitter circuitry. The receiver circuitry may convert received RF signals to baseband signals, and the baseband circuitry may convert the baseband signals to one or more bit streams. The transmitter circuitry may convert one or more bit streams to baseband signal and convert the baseband signals to RF signals for transmission.

In some embodiments, the UE 400 may be configured to receive orthogonal frequency division multiplexed (OFDM) communication signals over a multicarrier communication channel in accordance with an orthogonal frequency division multiple access (OFDMA) communication technique. The OFDM signals may comprise a plurality of orthogonal sub-carriers. In some broadband multicarrier embodiments, eNBs (such as eNBs 104, 106 and 108 (FIG. 1) may be part of a broadband wireless access (BWA) network, such as a 3rd Generation Partnership Project (3GPP) Universal Terrestrial Radio Access Network (UTRAN) Long-Term-Evolution (LTE) or a Long-Term-Evolution (LTE) communication network, although the scope of the embodiments is not limited in this respect. In these broadband multicarrier embodiments, the UE 400 and the eNBs may be configured to communicate in accordance with an OFDMA technique for 3GPP-LTE. The OFDMA technique may be either a frequency domain duplexing (FDD) technique that uses different uplink and downlink spectrums or a time-domain duplexing (TDD) technique that uses the same spectrum for uplink and downlink.

In some LTE embodiments, the basic unit of the wireless resource is the Physical Resource Block (PRB), such as resource block 300 (FIG. 3). The PRB may comprise 12 sub-carriers in the frequency domain×0.5 milliseconds (ms) in the time domain. The PRBs may be allocated in pairs (in the time domain). In these embodiments, the PRBs may comprise a plurality of resource elements (REs), such as REs 301 (FIG. 3). A RE may comprise one sub-carrier×one symbol, although this is not a requirement.

In some embodiments, an eNB may transmit channel state information reference signals (CIS-RS) and/or a common reference signal (CRS). These reference signals 302 may be transmitted in predetermined PRBs and may be used to determine an RSRP which may be used to calculate an RSRQ as described herein. In some other embodiments, other downlink reference signals may be used.

In some embodiments, the UE 400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE 400 and reported to the eNB. In some embodiments, the UE 400 may transmit a physical uplink control channel (PUCCH) of format 2, 2a or 2b containing the CQI/PMI or RI.

In these embodiments, the CQI may be an indication of the downlink mobile radio channel quality as experienced by the UE 400. The CQI allows the UE 400 to propose to an eNB an optimum modulation scheme and coding rate to use for a given radio link quality so that the resulting transport block error rate would not exceed a certain value, such as 10%. In some embodiments, the UE 400 may report a wideband CQI value which refers to the channel quality of the system bandwidth. The UE 400 may also report a sub-band CQI value per sub-band of a certain number of resource blocks 300 which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks 300 that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE 400 in which two or more cooperating/coordinating points, such as remote-radio heads (RRHs), transmit jointly. In these embodiments, the joint transmissions may be MIMO transmissions and the cooperating points are configured to perform joint beamforming.

As mentioned above, in some embodiments, the handover initiation parameters may be selected based the serving cell type and the target cell type. The serving cell type may comprise either a macro cell or a pico cell and the target cell type may comprise either a macro cell or a pico cell. In these embodiments, the use of the serving and target cell type to further select an A3offset-TTT pair and the use of the RSRQ of the target and serving cell (instead of RSRP) for triggering handover initiation may help reduce the handover failure rate.

In these embodiments, a macro to macro handover comprises a handover from a macro serving cell to a macro target cell, a pico to macro handover comprises a handover from a pico serving cell to a macro target cell, a macro to pico handover comprises a handover from a macro serving cell to a pico target cell, and a pico to pico handover comprises a handover from a pico serving cell to a pico target cell. In some embodiments, a pico cell may be considered micro, pico or femto cell and may reside within a macro cell (as illustrated in FIG. 1). In these embodiments, the handover type may comprise one of a macro to macro handover, a pico to macro handover, a macro to pico handover; and a pico to pico handover.

In some of these embodiments, the A3offset-TTT pair may be selected from a table, such as the table of FIG. 5, based on the velocity of the UE 400 and the handover type. The table may be stored in memory 408 of the UE 400.

In some of these embodiments, the UE 102 may determine at least one of the serving cell type and the target cell type based on cell or eNB identification information transmitted by the eNB 104 of the serving cell 101 and/or the eNB (eNB 106 or eNB 108) of the target cell (cell 103 or cell 105) indicating whether a cell is a macro cell or a pico cell. In some embodiments, cell or eNB identification information indicating whether the cell is a macro cell or a pico cell may be carried on a broadcast channel, such as the physical broadcast channel (PBCH) or the physical downlink shared channel (PDSCH) in an LTE network, although this is not a requirement.

In some embodiments, the UE 102 may determine at least one of the serving cell type and the target cell type based on measured signal strength of reference signals 302 transmitted by the eNB of the serving cell 101 and/or the eNB of the target cell 103 or 105. In these embodiments, the signal strength of reference signals 302 transmitted by an eNB of a macro cell (i.e., a macro eNB) may be significantly greater than the signal strength of reference signals 302 transmitted by an eNB of a pico cell (i.e., a pico eNB) allowing the UE 102 to determine the cell type regardless of whether the UE 102 is near a cell center or cell edge. In some embodiments, the eNB of the serving cell 101 and/or the eNB of the target cell 103 or 105 may transmit an indicator of signal strength which may be used to determine the cell type.

In some embodiments, for a handover from a pico serving cell to a macro target cell, a smaller A3offset value and a smaller TTT are selected (than if selected based on velocity alone). For a handover from a macro serving cell to a pico target cell, a larger A3offset value 205 and a smaller TTT 207 are selected (than if selected based on velocity alone).

In accordance with some embodiments, the UE 102 may be further configured to adaptively select handover initiation parameters based, at least in part, on the velocity of the UE 102. In these embodiments, the UE 102 may determine a reference signal received quality (RSRQ) of a serving cell (i.e., cell 101) and an RSRQ of a target cell (i.e., cell 103). The UE 102 may transmit a measurement report to serving eNB 104 for handover from the serving cell 101 to the target cell 103 when the target cell RSRQ exceeds the serving cell RSRQ in accordance with the selected handover initiation parameters. In some of these embodiments, the handover initiation parameters may include an offset value, such as an A3offset value, and a time-to-trigger (TTT). The A3offset value and the TTT may comprise an A3offset-TTT pair.

In these embodiments, the use of the velocity of the UE 102 to select handover initiation parameters, such as an A3offset-TTT pair, and the use of the RSRQ of the target and serving cell 103 and 101 (e.g., instead of RSRP) for triggering handover initiation may help reduce the handover failure rate. These embodiments are described in more detail below.

In some embodiments, instead of the velocity or speed of the UE 102, the handover initiation parameters may be selected based on the mobility state of the UE 102.

In some embodiments, for greater UE velocities, a smaller A3offset value 205 and a shorter TTT 207 are selected. For lesser UE velocities, a greater A3offset value 205 and a longer TTT 207 are selected. In these embodiments, the A3offset value 205 and TTT 207 may be inversely related to the velocity or mobility state of the UE 102.

In some embodiments, the measurement report 209 may include the serving cell RSRQ 201 and the target cell RSRQ 203 that was measured at expiration of the TTT timer. The measurement report 209 may also include the RSRQ of other neighbor cells. In some embodiments, the measurement report 209 may be referred to as a trigger measurement report. In some of these embodiments, the neighbor cell with the greatest/strongest RSRQ may be identified as the target cell 103. The measurement report 209 may identify a cell by its physical cell identifier (physcellid) and in some embodiments; a closed subscriber group (CSG) identity of the cell may be included. In some alternate embodiments, the measurement report 209 may be used to trigger a handover to the target cell 103 and may not necessarily include RSRQ values.

Conventionally, it has been observed that most HO failures happens in state 2 where HO command is failed to be received by the UE (i.e., reference number 211 FIG. 2). FIG. 2 illustrates the serving cell RSRP 201 and target cell RSRP 203 when the UE 102 is approaching the target cell. Since it is the nature that the target cell RSRP 203 will be increasing while serving cell RSRP 201 will be decreasing when the UE 102 is moving from one cell to another cell. This phenomenon causes the HO command failed to be receive by the UE due to low SINR at UE from the serving cell (i.e., at time 211). As a result, the UE 102 declares radio link failure and cannot complete HO successfully. The HO command failure delivery problem is the major HOF in Hetnet LTE networks. In accordance with embodiments, RSRQ is used for a fast HO to reduce the chances of HO command failure delivery and at the same time, and a current cell time of stay (if it is too short) may be used to scale up TTT to avoid short time of stay/ping-pong scenario.

In accordance with embodiments, When the UE experiences a very low RSRQ (such as below −15 dB), because of the chance of HOF/RLF is so high, we should have a fast radio link recovery process so that the UE does not need to wait for T310 to expire in order to recover the connectivity. But the radio link recovery is not the scope of this IDF.

When a UE measures the RSRQ which is less than −7 dB, the UE needs to send the measurement report as soon as possible. Otherwise the UE will face HOF (i.e. HO command failure). Therefore, the UE should scale the TTT down for fast HO. When the UE detects the RSRQ is more than −7 dB, the UE measures the time of stay of a serving cell, if it is greater than 2 s, it is unlikely UE is ping-pong between cells, we can encourage to HO faster. So in this case, a medium short TTT can be used. When UE time of stay is short, to avoid ping-pong, the UE will scale the TTT up in order to make sure the target cell is the correct cell UE should HO to. Lastly, UE can choose TTT as 1 s-current time of stay. It is a value inverts proportional to time of stay.

In general, the network can configure the following parameters for UE to scale TTT using the serving cell RSRQ:
  RSRQ RLF threshold
  RSRQ fast HO threshold
  A3offset, TTT and Short time-of-stay (ToS) threshold pairs for Ping-pong avoidance (this can be multiple layers. The example above has 3 layers)

In some embodiments, the following changed may be made in 3GPP 36.331 by adding the following information element shown with underline:

ReportConfigEUTRA information element

```
-- ASN1START
ReportConfigEUTRA ::=              SEQUENCE {
    triggerType                        CHOICE {
        event                              SEQUENCE {
            eventId                            CHOICE {
                eventA1                            SEQUENCE {
                    a1-Threshold                       ThresholdEUTRA
```

| ReportConfigEUTRA information element | |
|---|---|
| }, | |
| eventA2 | SEQUENCE { |
| a2-Threshold | ThresholdEUTRA |
| }, | |
| eventA3 | SEQUENCE { |
| a3-Offset | INTEGER (−30..30), |
| reportOnLeave | BOOLEAN |
| }, | |
| eventA4 | SEQUENCE { |
| a4-Threshold | ThresholdEUTRA |
| }, | |
| eventA5 | SEQUENCE { |
| a5-Threshold1 | ThresholdEUTRA, |
| a5-Threshold2 | ThresholdEUTRA |
| }, | |
| ..., | |
| eventA6-r10 | SEQUENCE { |
| a6-Offset-r10 | INTEGER (−30..30), |
| a6-ReportOnLeave-r10 | BOOLEAN |
| } | |
| eventA7-r12 | SEQUENCE { |
| a7-RSRQFastHOThreshold-r12 | RSRQ-Range, |
| a7-fastHOConfig-r12 | SEQUENCE (SIZE(1..3) OF FastHOConfig, |
| a7-SToSThreshold-r12 | INTEGER (1..4), |
| } | |
| }, | |
| hysteresis | Hysteresis, |
| timeToTrigger | TimeToTrigger |
| }, | |
| periodical | SEQUENCE { |
| purpose | ENUMERATED { |
| | reportStrongestCells, |
| reportCGI} | |
| } | |
| }, | |
| triggerQuantity | ENUMERATED {rsrp, rsrq}, |
| reportQuantity | ENUMERATED {sameAsTriggerQuantity, both}, |
| maxReportCells | INTEGER (1..maxCellReport), |
| reportInterval | ReportInterval, |
| reportAmount | ENUMERATED {r1, r2, r4, r8, r16, r32, r64, infinity}, |
| ..., | |
| [[ si-RequestForHO-r9 | ENUMERATED {setup}   OPTIONAL, -- Cond reportCGI |
| ue-RxTxTimeDiffPeriodical-r9 | ENUMERATED {setup}   OPTIONAL -- Need OR |
| ]], | |
| [[ includeLocationInfo-r10 | ENUMERATED {true}   OPTIONAL, -- Cond reportMDT |
| reportAddNeighMeas-r10 | ENUMERATED {setup}   OPTIONAL -- Need OR |
| ]] | |
| } | |
| ThresholdEUTRA ::= | CHOICE{ |
| threshold-RSRP | RSRP-Range, |
| threshold-RSRQ | RSRQ-Range |
| } | |
| FastHOConfig ::= | SEQUENCE { |
| ToSThreshold-r12 | INTEGER (1..4), |
| a3-offset-r12 | INTEGER (−30..30), |
| timeToTrigger-r12 | TimeToTrigger, |
| } | |
| -- ASN1STOP | |

| ReportConfigEUTRA field descriptions |
|---|
| a3-Offset/a6-Offset |
| Offset value to be used in EUTRA measurement report triggering condition for event a3/a6. The actual value is IE value * 0.5 dB. |
| aN-ThresholdM |
| Threshold to be used in EUTRA measurement report triggering condition for event number aN. If multiple thresholds are defined for event number aN, the thresholds are differentiated by M. |

-continued

| ReportConfigEUTRA field descriptions |
|---|
| eventId |
| Choice of E-UTRA event triggered reporting criteria.<br>maxReportCells |
| Max number of cells, excluding the serving cell, to include in<br>the measurement report.<br>reportAmount |
| Number of measurement reports applicable for triggerType event<br>as well as for triggerType periodical. In case purpose is set<br>to reportCGI only value 1 applies.<br>reportOnLeave/a6-ReportOnLeave |
| Indicates whether or not the UE shall initiate the measurement<br>reporting procedure when the leaving condition is met for a<br>cell in cellsTriggeredList, as specified in 5.5.4.1.<br>reportQuantity |
| The quantities to be included in the measurement report. The<br>value both means that both the rsrp and rsrq quantities are<br>to be included in the measurement report.<br>si-RequestForHO |
| The field applies to the reportCGI functionality, and when<br>the field is included, the UE is allowed to use autonomous<br>gaps in acquiring system information from the neighbour cell,<br>applies a different value for T321, and includes different<br>fields in the measurement report.<br>ThresholdEUTRA |
| For RSRP: RSRP based threshold for event evaluation. The<br>actual value is IE value - 140 dBm.<br>For RSRQ: RSRQ based threshold for event evaluation. The<br>actual value is (IE value - 40)/2 dB.<br>timeToTrigger |
| Time during which specific criteria for the event needs to be<br>met in order to trigger a measurement report.<br>triggerQuantity |
| The quantities used to evaluate the triggering condition for the<br>event. The values rsrp and rsrq correspond to Reference Signal<br>Received Power (RSRP) and Reference Signal Received Quality<br>(RSRQ), see TS 36.214 [48].<br>ue-RxTxTimeDiffPeriodical |
| If this field is present, the UE shall perform UE Rx-Tx time<br>difference measurement reporting and ignore the fields<br>triggerQuantity, reportQuantity and maxReportCells. If the<br>field is present, the only applicable values for the<br>corresponding triggerType and purpose are periodical<br>and reportStrongestCells respectively.<br>a7-RSRQFastHOThreshold-r12 |
| This is a RSRQ Threshold that when UE measuresRSRQvalue<br>below this threshold, UE will preform a fastHOandset<br>TTT to the smallest value.<br>a7-SToSThreshold-r12 |
| When UE time of stay of in current cell islessthanthetime<br>of stay config in a7-fastHOConfig, UE will settimetotrigger<br>to this Threshold - current timeofstay.<br>FastHOConfig |
| If UE time of stay in current cell is longerthanToSThreshold-r12,<br>UE set the corresponding a4-offset-r12 an timeToTrigger-r12<br>and perform A3event. |

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by user equipment (UE) for handover initiation comprising:
    measuring a reference signal received quality (RSRQ) of a serving cell;
    scaling a time-to-trigger (TTT) based on at least one of the measured RSRQ and a time-of-stay in the serving cell; and
    sending a measurement report after expiration of the scaled TTT,
    wherein when the measured RSRQ is below a predetermined value, scaling the TTT comprises scaling down the TTT to a shorter TTT, and
    wherein when the measured RSRQ is greater than or equal to the predetermined value, the method includes determining a time-of-stay in the serving cell and scaling down the TTT when the time-of-stay is greater than a predetermined value.

2. The method of claim 1 further comprising:
    scaling up the TTT when the time-of-stay is less than or equal to the predetermined value; and
    sending the measurement report after expiration of the scaled-up TTT.

3. An apparatus for User equipment (UE) arranged for handover initiation in a 3GPP LTE network, the apparatus comprising:
    processing circuitry to measure a reference signal received quality (RSRQ) of a serving cell and scale a time-to-trigger (TTT) based on at least one of the measured RSRQ and a time-of-stay in the serving cell; and
    physical-layer circuitry (PHY) to send a measurement report after expiration of the scaled TTT,
    wherein the processing circuitry is further arranged to scale down the TTT to a shorter TTT when the measured RSRQ is below a predetermined value, and
    wherein when the measured RSRQ is greater than or equal to the predetermined value, the processing circuitry is further arranged to determine a time-of-stay in the serving cell and scale down the TTT when the time-of-stay is greater than a predetermined value.

4. The apparatus of claim 2 wherein the processing circuitry is further arranged to scale up the TTT when the time-of-stay is less than or equal to the predetermined value, and
    wherein the PHY is configured to send the measurement report after expiration of the scaled-up TTT.

5. A non-transitory computer-readable storage medium that stores instructions for execution by one or more processors to perform operations for handover initiation, the operations to configure the one or more processors to:
    determine a measured reference signal received quality (RSRQ) of a serving cell;
    scale a time-to-trigger (TTT) based on at least one of the measured RSRQ and a time-of-stay in the serving cell; and
    provide instructions for sending a measurement report after expiration of the scaled TTT,
    wherein when the measured RSRQ is below a predetermined value, the TTT is scaled down to a shorter TTT,
    wherein when the measured RSRQ is greater than or equal to the predetermined value, a time-of-stay in the serving cell is determined and the TTT is scaled down when the time-of-stay is greater than a predetermined value.

* * * * *